United States Patent
Sendonaris et al.

(10) Patent No.: US 10,254,379 B2
(45) Date of Patent: Apr. 9, 2019

(54) SYSTEMS AND METHODS FOR ESTIMATING A POSITION OF A RECEIVER

(71) Applicant: NextNav, LLC, Sunnyvale, CA (US)

(72) Inventors: Andrew Sendonaris, Los Gatos, CA (US); Sameet Deshpande, Bangalore (IN); Mir Hamza Mahmood, Mountain View, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/877,096

(22) Filed: Jan. 22, 2018

(65) Prior Publication Data
US 2018/0224519 A1  Aug. 9, 2018

Related U.S. Application Data

(60) Provisional application No. 62/572,497, filed on Oct. 15, 2017, provisional application No. 62/456,492, filed on Feb. 8, 2017.

(51) Int. Cl.
| | | |
|---|---|---|
| *H04W 4/02* | (2018.01) | |
| *G01S 5/02* | (2010.01) | |
| *G01S 19/31* | (2010.01) | |
| *G01S 19/24* | (2010.01) | |
| *G01S 5/14* | (2006.01) | |

(Continued)

(52) U.S. Cl.
CPC .......... *G01S 5/0263* (2013.01); *G01S 5/0252* (2013.01); *G01S 5/14* (2013.01); *G01S 19/24* (2013.01); *G01S 19/31* (2013.01); *G01S 19/48* (2013.01); *H04W 4/02* (2013.01); *G01S 5/0294* (2013.01); *G01S 19/20* (2013.01); *G06F 17/18* (2013.01)

(58) Field of Classification Search
CPC ...... G01S 5/0263; G01S 19/48; G01S 5/0252; G01S 5/14; G01S 19/24; G01S 19/31; G01S 19/20; G01S 5/0294; H04W 4/02; G06F 17/18
See application file for complete search history.

(56) References Cited

U.S. PATENT DOCUMENTS

| | | |
|---|---|---|
| 2010/0178934 A1 | 7/2010 | Moeglein |
| 2011/0025496 A1* | 2/2011 | Cova ............... G01S 5/0027 340/539.13 |
| 2011/0298659 A1* | 12/2011 | Alizadeh-Shabdiz ............... G01S 5/0257 342/357.29 |

OTHER PUBLICATIONS

Form PCT/ISA/206, PCT/US2018/014711, "Invitation to pay additional fees and, where applicable, protest fee", 5 page(s); EPO Form P04A42, PCT/US2018/014711, "Information on search strategy", 1 page(s); EPO Form 1707, PCT/US2018/014711, "Provisional opinion accompanying the partial search result", 7 page(s). dated May 4, 2018.

(Continued)

*Primary Examiner* — Chuong A Ngo
(74) *Attorney, Agent, or Firm* — Kyle Pendergrass

(57) ABSTRACT

Estimating a position of a mobile device. Particular systems and methods for estimating a position of a mobile device using information from two positioning technologies determine different position estimates for the mobile device using different positioning technologies, and determine a final position estimate for the mobile device using a weighted combination of the different position estimates. In some implementations, the weighted combination is a weighted average or a weighted median of the different position estimates. Weights may be determined using respective uncertainty metrics corresponding to the respective position estimates.

20 Claims, 11 Drawing Sheets

(51) Int. Cl.
  *G01S 19/48*   (2010.01)
  *G06F 17/18*   (2006.01)
  *G01S 19/20*   (2010.01)

(56) References Cited

OTHER PUBLICATIONS

Form PCT/ISA/220, PCT/US2018/014711, "Notification of Transmittal of the International Search Report and the Written Opinion of the International Search Authority, of the Declaration", 1 page(s); Form PCT/ISA/210, PCT/US2018/014711, "International Search Report", 5 page(s); EPO Form P04A42, PCT/US2018/014711, "Information on Search Strategy", 1 page(s); Form PCT/ISA/237, PCT/US2018/014711, "Written Opinion of the International Search Authority", 12 page(s); and claims under review, 4 pages. dated Jun. 26, 2018.

\* cited by examiner

SYSTEMS AND METHODS FOR ESTIMATING A POSITION OF A RECEIVER

BACKGROUND

Trilateration is the process of using geometry to estimate the position of the mobile device using estimated distances traveled by the different "positioning" or "ranging" signals that are received by a mobile device from the different transmitters, satellites, or other types of beacons of a particular positioning network. If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons in that positioning network can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012.

Many known approaches for estimating the position of a mobile device use a single positioning network that provides a position estimate with a particular accuracy and a particular level of certainty. However, as described in the disclosure that follows, improved accuracy and certainty can be achieved using information from two or more positioning networks.

DETAILED DESCRIPTION

As discussed further below, it is possible to achieve more-accurate position estimates of greater certainty by combining position estimates from different positioning technologies, or using positioning information (e.g., a position estimate, an uncertainty metric) of one positioning technology to improve the position estimate of another positioning technology.

Different types of embodiments described in this disclosure can be used to estimate the position of a mobile device using position estimates and signaling from different sources. Embodiments disclosed herein provide various advantages, including improved accuracy and certainty for estimated positions of mobile devices.

In a first type of embodiment described in further detail below, position estimate(s) from a first positioning technology are used to perform receiver autonomous integrity monitoring (RAIM) on pseudoranges that are computed using signaling of a second network. The acceptable accuracy of the first positioning technology depends on the environment (e.g., better than 10 meters for rural environments, 20 meters for sub-urban environments, and 30 meters for urban environments). If a position estimate from the first positioning technology is available and is within the desired accuracy based on the environment, that position estimate can be used to determine which pseudorange(s) of the second technology are consistent with the position estimate. Any pseudorange is that is not consistent with the position estimate can be removed from consideration or adjusted before consistent or adjusted pseudoranges are provided to a particle filter for computing an estimate of the mobile device's position using the provided pseudoranges.

In a second type of embodiment described in further detail below, different position estimates from different positioning technologies are combined.

In a third type of embodiment described in further detail below, location information from a first positioning technology is used to modify the weights of different position estimate hypotheses (e.g., weights, or particles in a particle filter) used by a second positioning technology. For example, given an LLA (Latitude, Longitude, Altitude) estimate with a particular level of uncertainty from the first positioning technology, particles in a particle filter of the second positioning technology are re-weighed by replacement weights or adjustments to previous weights so particles that are closer to the LLA estimate are weighed higher than particles that are comparatively further away from the LLA estimate. In some implementations, the new weights will depend on the level of uncertainty in the LLA estimate from the first positioning technology.

Figure 1:
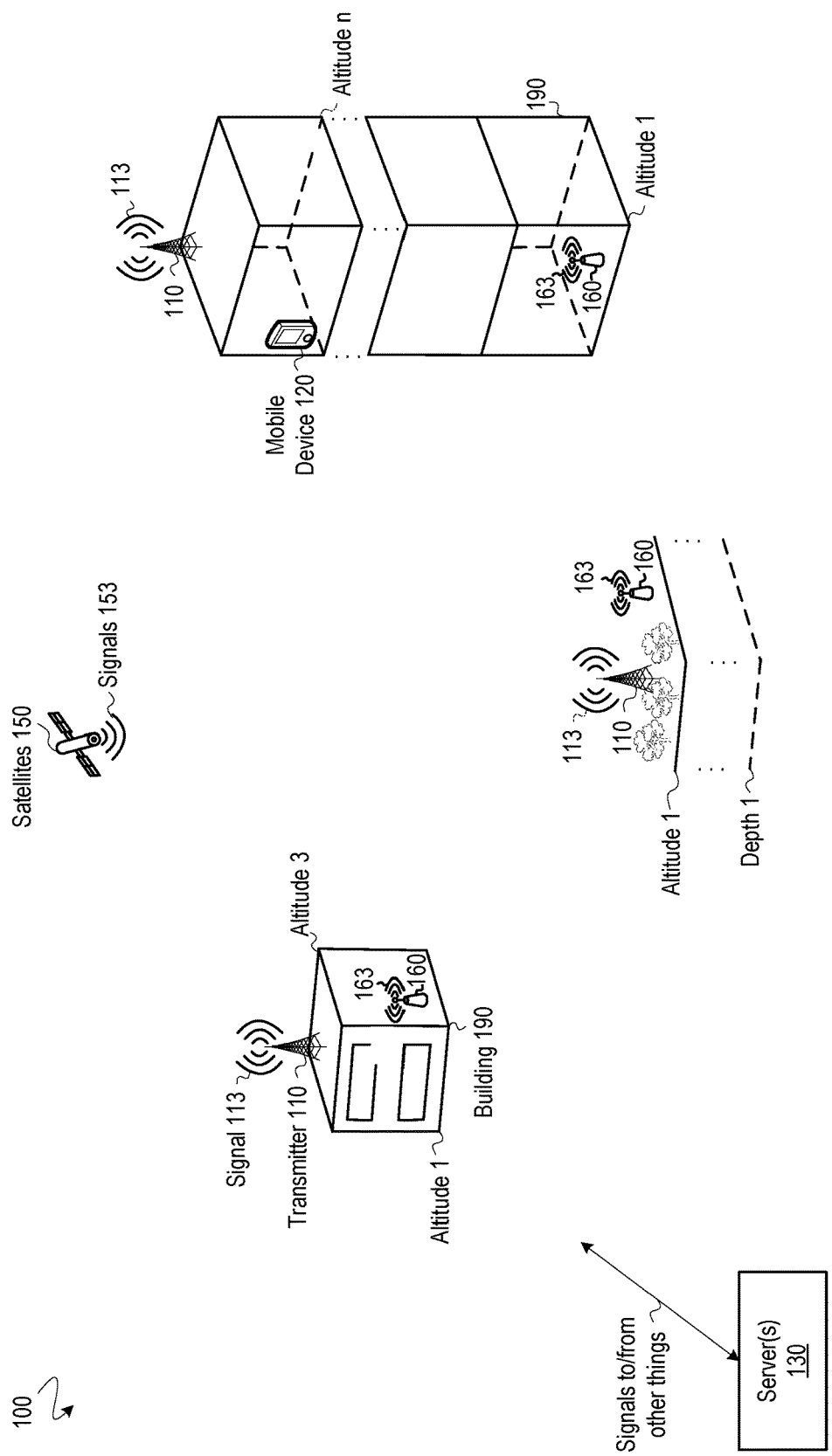
FIG. 1 depicts an operational environment for estimating a position of a mobile device.

Attention is initially drawn to an operational environment 100 illustrated in FIG. 1, which includes different positioning technologies for use in estimating a position of a mobile device 120. The different positioning technologies include a network of terrestrial transmitters 110, a satellite network 150, and a network of local beacons 160 (e.g., Bluetooth, WiFi, or other).

Each of the transmitters 110, the local beacons 160, and the mobile device 120 may be located at different altitudes or depths that are inside or outside various natural or manmade things (e.g. buildings) 190. Positioning signals 113, 153, or 163 are respectively generated and transmitted by the transmitters 110, the satellites 150, or the beacons 163 using known approaches, and also received and processed by the mobile device 120 using known approaches. The mobile device 120 may take different forms, including a mobile phone, a tablet, a laptop, a tracking tag, a receiver, or another suitable device that can receive and process the positioning signals 113, 153 and/or 163.

Different approaches for estimating a position of a mobile device are provided below.

Using Position Estimate(s) from One or More Positioning Technologies to Correct Pseudoranges and/or Filter Pseudoranges If a position estimate from the one positioning technology is available to a mobile device 120, and is within a desired accuracy based on the environment of the mobile device 120, that position estimate can be used to identify one or more inaccurate pseudoranges that were computed using another positioning technology. The identified pseudoranges can be corrected, and those corrected pseudoranges can be used to compute an estimated position of the mobile device. Alternatively, the identified pseudoranges can be ignored such that the ignored pseudoranges are not used to compute an estimated position of the mobile device.

Figure 2:
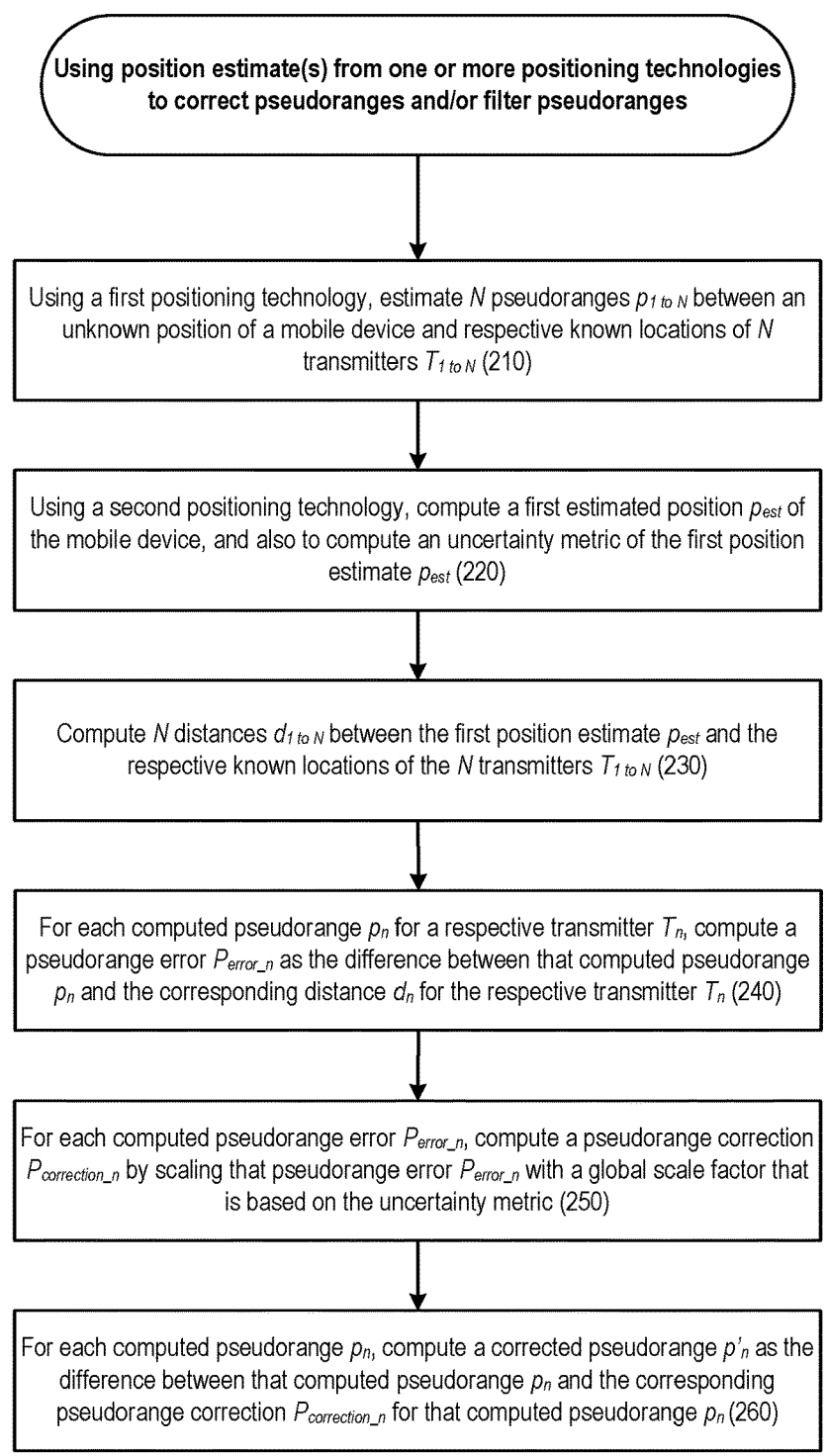
FIG. 2 provides a process for identifying pseudoranges to correct before use in computing an estimated position of a mobile device.

One embodiment for identifying pseudorange(s) to correct before use in computing an estimated position of a mobile device is shown in FIG. 2 and described below.

A first positioning technology (e.g., satellite network or terrestrial transmitter network) is used to estimate N pseudoranges $p_{1\_N}$ between an unknown position of a mobile device and respective known locations of N transmitters $T_{1\_N}$ (210). A vector of the pseudoranges $P^k$ with a number of elements equal to the number of transmitters seen by the mobile device may also be computed.

A second positioning technology (e.g., another satellite network or terrestrial transmitter network, Wi-Fi network, Bluetooth network, or other) is used to compute a first estimated position $p_{est}$ of the mobile device, and also to compute an uncertainty metric $\sigma_{ext}^2$ (also referred to herein as a confidence interval or a confidence metric) of the first position estimate $p_{est}$ (220).

N distances $d_{1\_N}$ between the first position estimate $p_{est}$ and the respective known locations of the N transmitters $T_{1\_N}$ are computed (230).

Known approaches may be used to compute the N pseudoranges $p_{1\_N}$, the first position estimate $p_{est}$, uncertainty metric $\sigma_{ext}^2$, and the N distances $d_{1\_N}$.

For each computed pseudorange $P_n$ (for n=1 through N) for a respective transmitter $T_n$, a pseudorange error $P_{error\_n}$ is computed as the difference between that computed pseudorange $p_n$ and the corresponding distance $d_n$ for the respective transmitter $T_n$ (240). A vector of the pseudorange errors $P^k_{error}$ with number of elements equal to the number of transmitters seen by the mobile device may also be computed.

For each computed pseudorange error $P_{error\_n}$ (for n=1 through N) a pseudorange correction $P_{correction\_n}$ is computed as $f(\sigma_{ext}^2)(P_{error\_n})$ where $f(\sigma_{ext}^2)$ is a global scale factor (250). By way of example, if the uncertainty of the first position estimate $p_{est}$ is low, meaning the estimate is highly reliable, $f(\sigma_{ext}^2)$ can be set close to 1; if the uncertainty is high, meaning the estimate is not highly reliable, $f(\sigma_{ext}^2)$ can be chosen as a small number that is less than 1 and approaches zero as the uncertainty increases. If the vector of the pseudorange errors $P^k_{error}$ is computed, a pseudorange correction $P^k_{correction}$ can be computed as $P^k_{correction}=f(\sigma_{ext}^2)(P^k_{error})$.

For each computed pseudorange $p_n$ (for n=1 through N), a corrected pseudorange $p'_n$ is computed as the difference between that computed pseudorange $p_n$ and the corresponding pseudorange correction $P_{correction\_n}$ (260) (e.g., $p'_n=p_n-P_{correction\_n}$). If the vector of the pseudoranges $P^k$ is computed, a corrected vector of the pseudoranges $P'^k$ . . . is computed as $P'^k=P^k-P^k_{correction}$).

The corrected pseudoranges $p'_n$ (for n=1 through N) are then used in a trilateration algorithm to compute an estimated position of the unknown position of the mobile device. Known approaches may be used to compute the estimated position using the corrected pseudoranges $p'_n$ in a known trilateration algorithm.

Assuming a scenario where a user with a mobile device is walking, one can continue to use the first position estimate that is determined at time t for all the position estimates obtained at time t+1, t+2, . . . , t+T, where T is chosen based on the speed with which the position mobile device is moving. As an example, if T=5 seconds is chosen, the assumption is that because the mobile device is moving at a slow speed (walking), the first position estimate determined 5 seconds ago might still be reliable, and therefore can be used to estimate and apply pseudorange corrections.

The process of estimating and using the pseudorange corrections for the next few time instances becomes more reliable if the positioning mobile device has inertial sensors (e.g., an accelerometer, a gyro, an e-compass), and has access to the velocity from those sensors and quality of velocity based on sensor platform configuration (e.g., in pocket, held-in-hand, hip-mounted, kept on desk, docked, etc.).

Discussion above for FIG. 2 relating to "transmitters" applies to any beacon (e.g., terrestrial transmitters, satellites, or other beacons). Discussion above for FIG. 2 relating to computation of differences between two numbers that generate a resultant number may be, in alternative embodiments, replaced by a different mathematical relationship whereby one of the numbers is used to mathematically adjust the other number to generate the resultant number.

Figure 11:
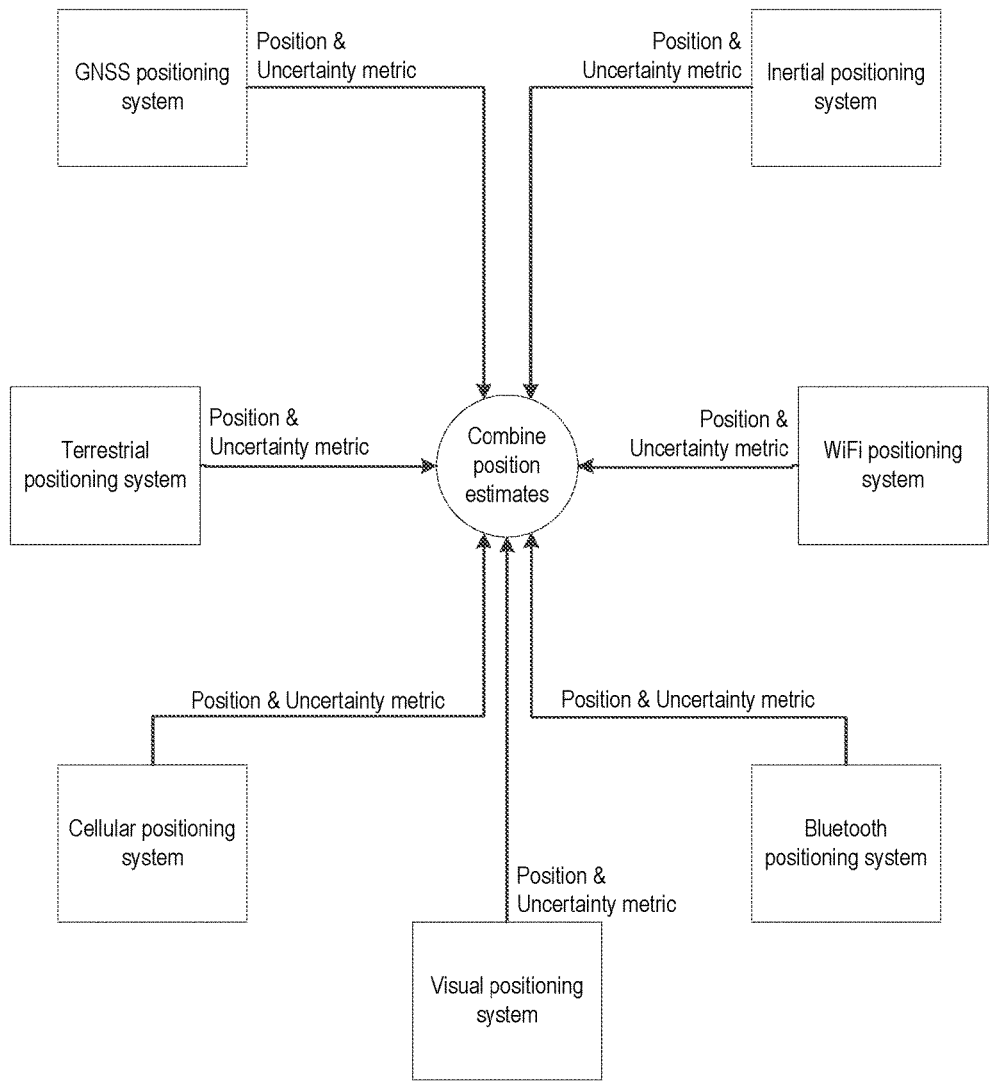
FIG. 11 depicts examples of scenarios when a mobile device receives multiple position estimates and respective uncertainty metrics for use in estimating a position of a mobile device.

Combining Position Estimates from Different Technologies in a Positioning Domain In some scenarios, a mobile device receives multiple position estimates and respective uncertainty metrics using k different positioning technologies. An example of such a scenario is shown in FIG. 11, where any combination of two or more positioning technologies can provide respective position estimates.

By way of example, a kth position estimate $x_k$ computed using the kth technology can be a three-dimensional vector such that $x_k$=[Latitude$_k$, Longitude$_k$, Altitude$_k$], while the uncertainty metric $\sigma_k$ computed using the kth technology can be a number reflecting the accuracy of the kth position estimate $x_k$. Different position estimates $x_1, x_2, \ldots x_K$ can be combined to compute a new position estimate as described below.

Figure 3:
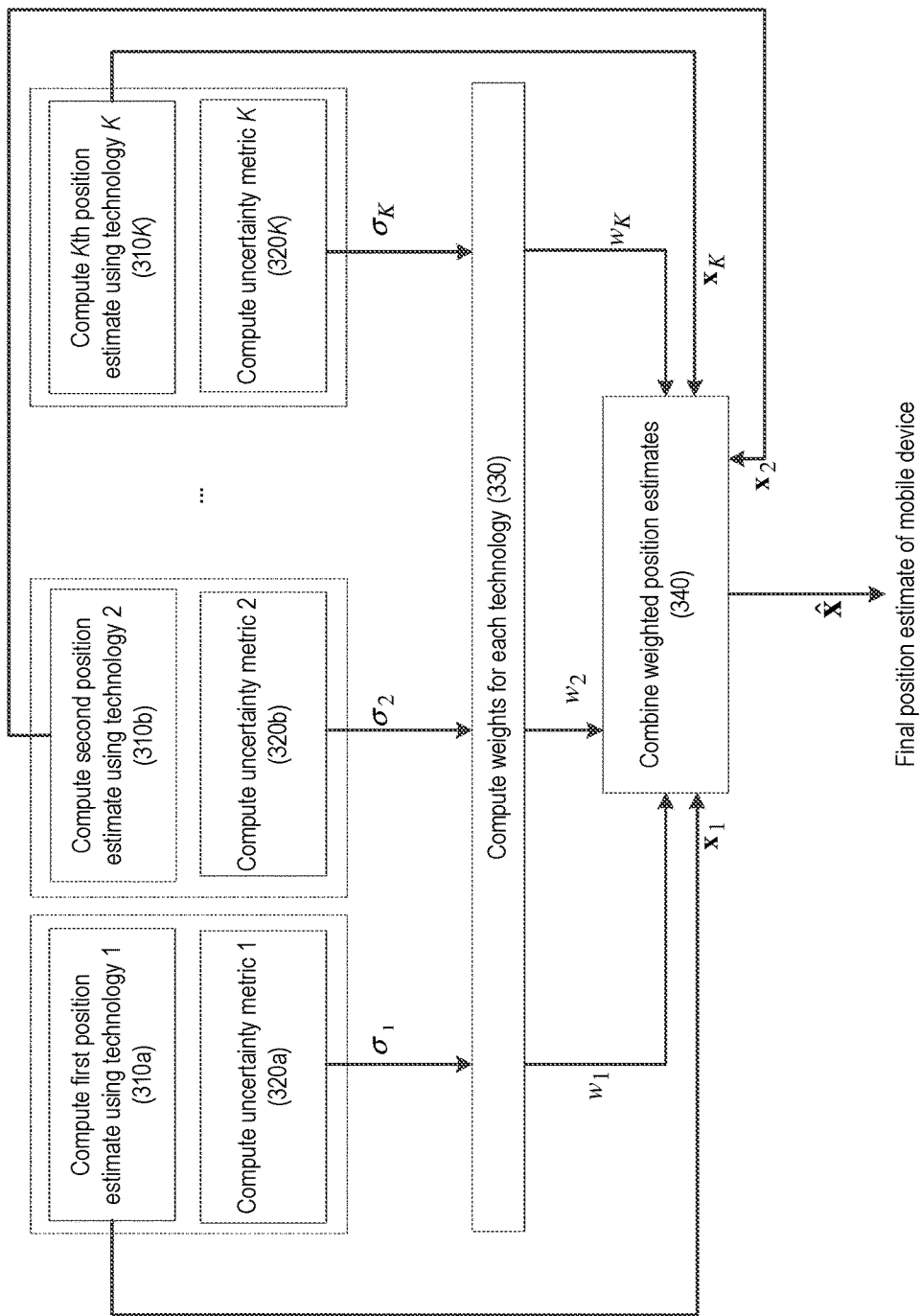
FIG. 3 provides a process for combining position estimates from different positioning technologies to estimate a position of a mobile device.

One embodiment for combining position estimates from K different positioning technologies is shown in FIG. 3. As shown in FIG. 3, position estimates $x_1, x_2, \ldots x_K$ are computed using K different positioning technologies (310a through 310K), and respective uncertainty metrics $\sigma_1$, $\sigma_2, \ldots, \sigma_K$ are computed using the K different positioning technologies (320a through 320K). Known approaches may be used to compute the position estimates and the uncertainty metrics. As shown in FIG. 3, the uncertainty metrics $\sigma_1, \sigma_2, \ldots, \sigma_K$ are used to determine weights $w_1, w_2, \ldots w_K$ for each of the K different positioning technologies (330). One approach for determining the weights $w_1, w_2, \ldots w_K$ is described below. The weights $w_1, w_2, \ldots w_K$ and the position estimates $x_1, x_2, \ldots x_K$ are used (e.g., combined) to determine a final position estimate $\hat{x}$ (340), as described in more detail below.

The steps of determining weights $w_1, w_2, \ldots w_K$ (330) and determining the final position estimate $\hat{x}$ (340) can be designed with the objective that the final position estimate $\hat{x}$ is optimal. One way to formulate the optimization problem is to determine the final position estimate $\hat{x}$ such that it maximizes a joint probability density function, or a maximum likelihood function, such as:

$$\max_x P(x_1, x_2, \ldots x_n | \hat{x}) \quad \text{(Equation 1)}.$$

The solution to Equation 1, and hence the design of the steps of determining weights $w_1, w_2, \ldots w_K$ and determining the final position estimate $\hat{x}$ depends on assumptions taken on the data being used.

One common assumption is to treat the data as Gaussian distributed, which results in the solution below:

$$\hat{x} = \sum_{k=1}^{K} w_k x_k, \quad \text{where } w_k = \frac{\frac{1}{\sigma_k^2}}{\sum_{k=1}^{K}\left(\frac{1}{\sigma_n^2}\right)}. \quad \text{(Equation 2)}$$

As a result, the final position estimate $\hat{x}$ is the weighted average of the position estimates obtained from all positioning technologies.

Figure 4:
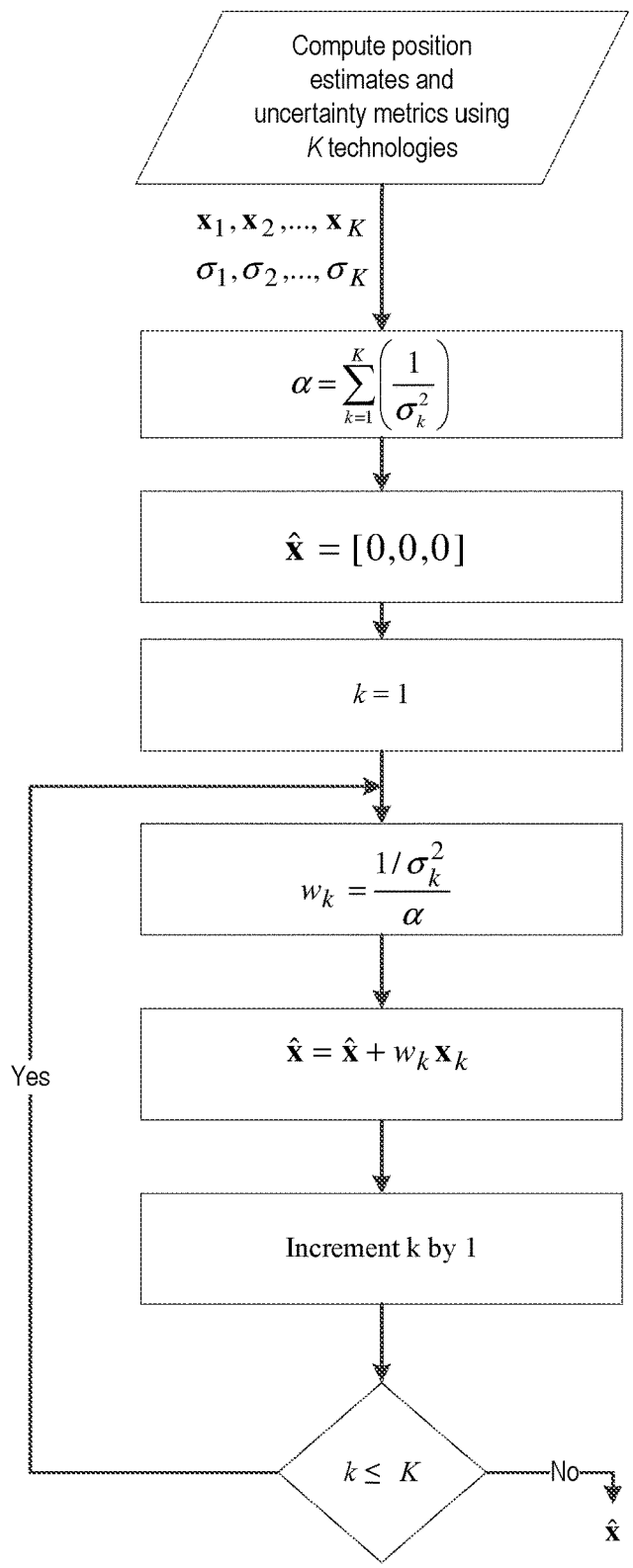
FIG. 4 depicts an implementation for generating a final position estimate by combining position estimates computed using different positioning technologies under a Gaussian assumption.

One implementation for combining position estimates computed using different positioning technologies under a Gaussian assumption of Equation 2 is depicted in FIG. 4, which shows the step involved in obtaining a weighted average position estimate (e.g., using all of the computed position estimates ($p_{k, \text{for } k=1\_K}$) obtained from various technologies during steps 310a-K of FIG. 3). The uncertainty metric $\sigma_k$ for each computed position estimate $p_k$ is inversely proportional to the accuracy of the respective position estimate. Each uncertainty metric is converted into a respective variance $1/\sigma^2_k$, and the respective variances are used to determine a total variance $\alpha$, where $$\alpha = \sum_{k=1}^{K}\left(\frac{1}{\sigma_k^2}\right).$$

For each variance $1/\sigma^2_k$, a weight $w_k$ is determined as a ratio of the individual variance $1/\sigma^2_k$ to the total variance $\alpha$, where $w_k=(1/\sigma_k^2)/\alpha$. The final position estimate $\hat{x}$ is computed as the sum of each individual position estimate $p_k$ scaled by its weight $w_k$.

Another assumption is to treat the data as Laplacian distributed, and to use a weighted median, which results in the solution below:

$$\hat{x} = \text{weighted\_median}(w_k, x_k), \quad \text{where } w_k = \frac{1}{\sigma_k}. \quad \text{(Equation 3)}$$

Use of a weighted median can reject more outliers than a weighted average. By way of example, a weighted median function can be implemented as follows in pseudocode:

```
function weighted_median(weights, values)
    sorted_weights, sorted_values) = sort(weights, values)
    where sorting is done in ascending order according to values
    for each (wt, val) in sorted_weights
        cummulative_weight = cumulative_weight + wt
        if cummulative_weight > 0.5
            return weighted median as val
        end
    end
end
```

Figure 5:
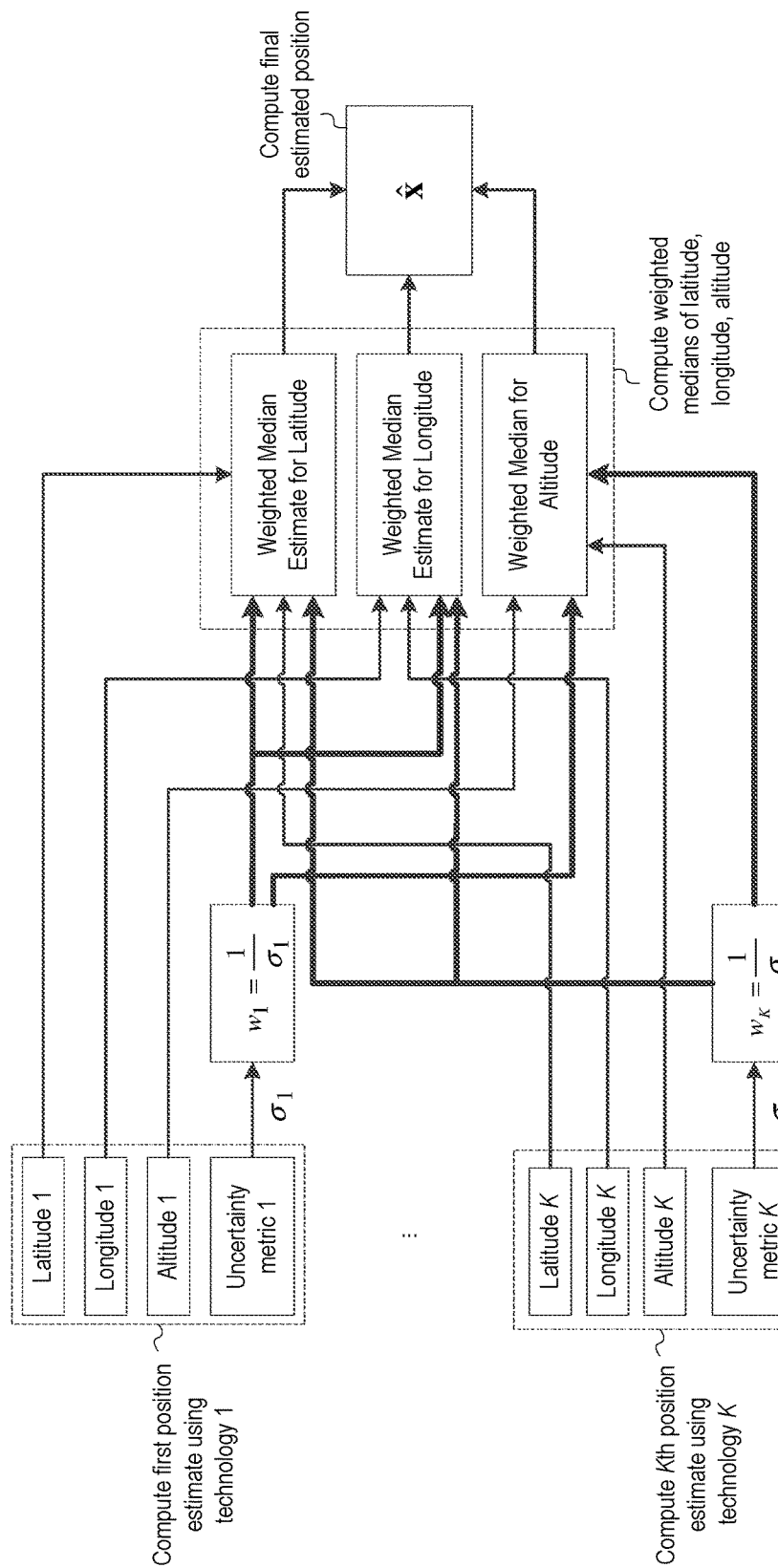
FIG. 5 depicts an implementation for generating a final position estimate by combining position estimates computed using different positioning technologies under a Laplacian assumption.

Therefore, the weighted median can be used to compute the final position estimate $\hat{x}$ by combining estimates from all positioning technologies. One implementation for combining position estimates computed using different positioning technologies under a Laplacian assumption and a weighted median of Equation 3 is depicted in FIG. 5, which shows a step involved in obtaining a median weighted average position estimate using all of the position estimates ($p_{k, \text{for } k=1\_K}$) obtained from various technologies. The uncertainty metric $\sigma_k$ of each position estimate $p_k$ is converted to a weight $w_k=1/\sigma_k$. A weighted median of the position estimates from all technologies is computed as the final position estimate $\hat{x}$. An example of the weighted median is shown in Equation 3.

As shown in FIG. 5, each of the position estimates ($p_{k, \text{for } k=1\_K}$) can be separated into different components comprising a latitude component, a longitude component, and an altitude component. Each component for each position estimate is weighted using the weight for that position estimate. A weighted median is computed using all of the weighted latitude components, and the result is used as the latitude for the final position estimate $\hat{x}$. A weighted median is computed using all of the weighted longitude components, and the result is used as the longitude for the final position estimate $\hat{x}$. A weighted median is computed using all of the weighted altitude components, and the result is used as the altitude for the final position estimate $\hat{x}$.

Correcting Uncertainty Metric Estimates from Various Technologies

Under some circumstances, an uncertainty metric provided by a positioning technology does not represent of the actual position error. Under such circumstances, a dedicated training phase may be performed where data is collected from several locations where ground truth is known, and then actual position error is calculated in order to determine a 'mapping' function that would adjust the uncertainty metric provided by the positioning technology to a new estimated uncertainty metric which is more closely representative of the actual position error.

Figure 6:
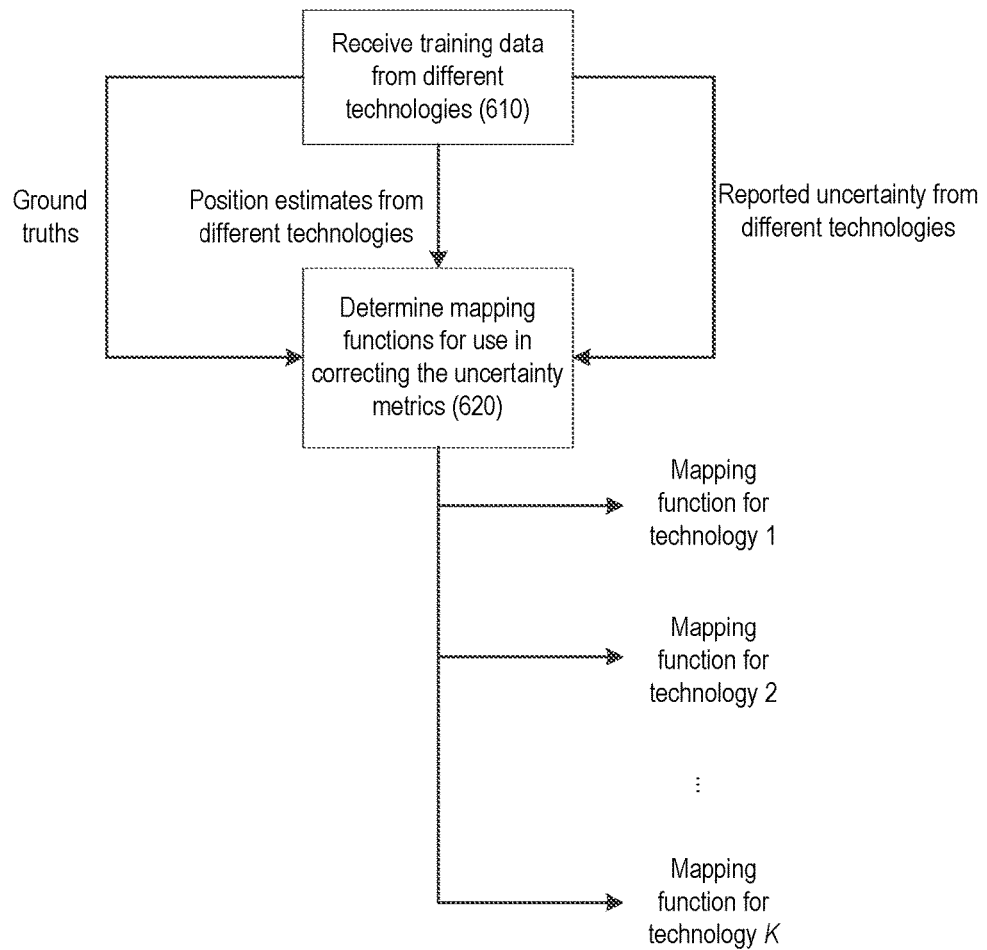
FIG. 6 provides a process for determining a mapping function used to compute a position estimate.

One embodiment for determining a mapping function is shown in FIG. 6. As shown in FIG. 6, training data is received from one or more different positioning technologies (610). Examples of training data include computed position estimates, uncertainty metrics, and ground truths corresponding to each other. The training data is used to determine one or more mapping functions for use in correcting one or more uncertainty metrics of the one or more different positioning technologies (620). Once a mapping function for a particular positioning technology is estimated by the procedure of FIG. 6, the embodiment for combining position estimates from K different positioning technologies shown in FIG. 3 can be adjusted to use available mapping functions to adjust computed uncertainty metrics before they are used during the weighting step, as illustrated in FIG. 7.

Figure 7:
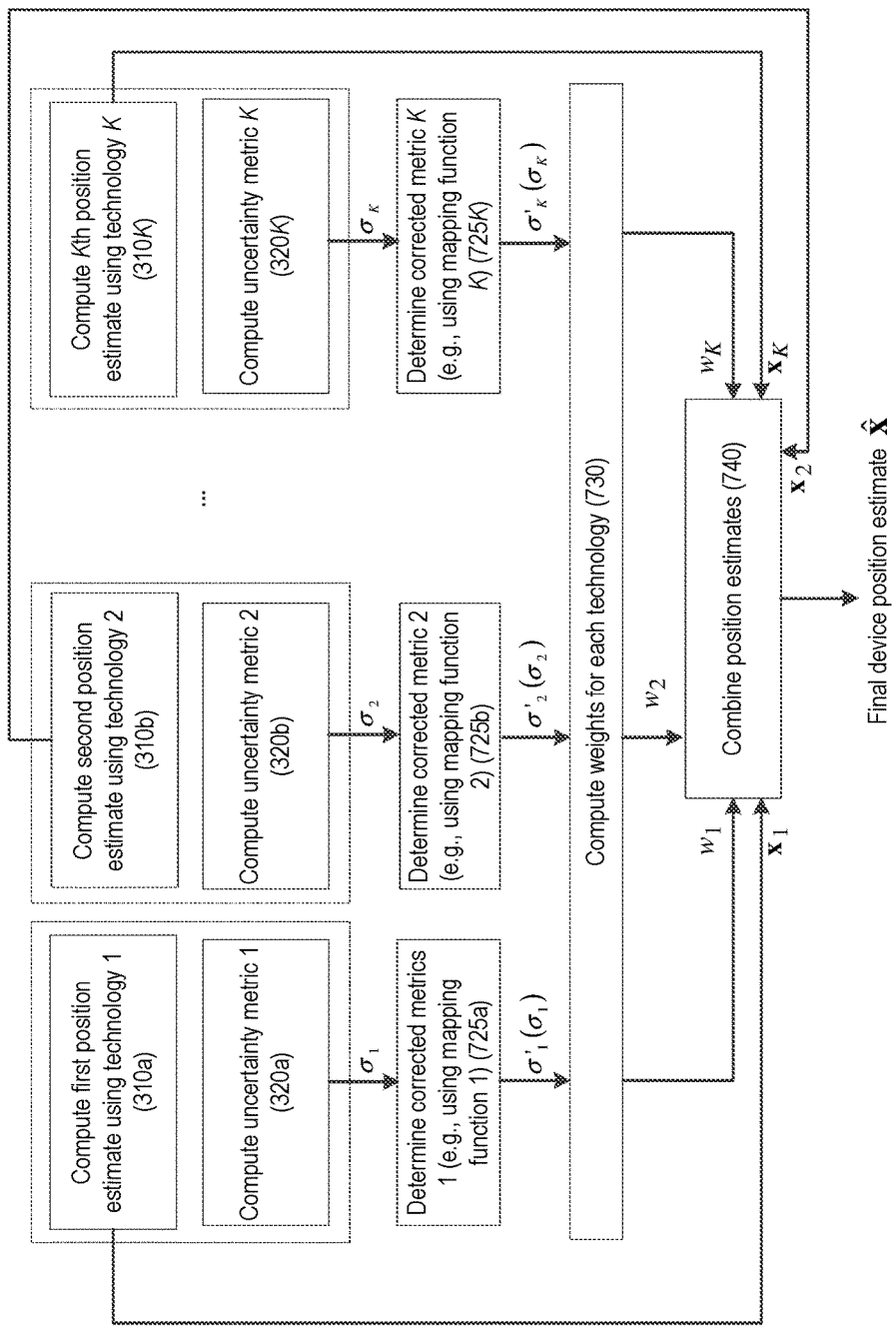
FIG. 7 provides a process for using mapping functions to adjust computed uncertainty metrics before the uncertainty metrics are used to estimate a position of a mobile device.

As shown in FIG. 7, position estimates $x_1, x_2, \ldots x_K$ are computed using K different positioning technologies (310a through 310K), and respective uncertainty metrics $\sigma_1, \sigma_2, \ldots, \sigma_K$ are computed using the K different positioning technologies (320a through 320K). Corrected metrics $\sigma'_1, \sigma'_2, \ldots, \sigma'_K$ are determined using the uncertainty metrics $\sigma_1, \sigma_2, \ldots, \sigma_K$ and mapping functions for each of the respective position estimates (725a through 725K). Examples of different approaches for determining a mapping function for a positioning technology, and for using the mapping function to determine a corrected metric are provided below. The corrected uncertainty metrics $\sigma'_1, \sigma'_2, \ldots, \sigma'_K$ are used to determine weights $w_1, w_2, \ldots w_K$ for each of the K different positioning technologies (730). One approach for determining the weights $w_1, w_2, \ldots w_K$ is described above with respect to FIG. 3. The weights $w_1, w_2, \ldots w_K$ and the position estimates $x_1, x_2, \ldots x_K$ are used (e.g., combined) to determine a final position estimate $\hat{x}$ (740). Approaches for determining the final position are described elsewhere herein.

Examples of different approaches for determining a mapping function for a positioning technology, and for using the mapping function to determine a corrected metric are provided below.

One approach assumes that the kth mapping function determined for the kth positioning technology has a 'slope-intercept' form, such as:

$$\sigma' = \alpha\sigma + \beta \qquad \text{(Equation 4),}$$

where $\sigma$ is the kth uncertainty metric reported by the kth positioning technology, $\sigma'$ is the variance of the error from the kth positioning technology, and $\alpha$ and $\beta$ are coefficients that map $\sigma$ to $\sigma'$ for the kth positioning technology. Reference herein to a "multiplied coefficient" refers to $\alpha$, and reference herein to an "added coefficient" refers to $\beta$. The coefficients $\alpha$ and $\beta$ can be estimated for a positioning technology using different approaches described below.

By way of example, the coefficients $\alpha$ and $\beta$ of the above mapping function can be estimated by collecting M sets of measurements reported by the kth positioning technology, where each set of measurements m includes an mth position estimate, an mth uncertainty metric $\sigma_m$, and an mth error $e_m$ (which is calculated based on distance between the mth position estimate and known ground truth). Assuming that the resulting error is Gaussian distributed, one can use a Maximum Likelihood (ML) approach to estimate the coefficients, as shown below:

$$\alpha_k, \beta_k = \arg\min_{\alpha,\beta} \sum_{m=1}^{M} \frac{e_m^2}{2(\alpha_k u_m + \beta_k)^2} + \ln(\alpha_k u_m + \beta_k). \qquad \text{(Equation 5)}$$

Estimation of the coefficients $\alpha$ and $\beta$ is independently performed for any of the K positioning technologies that provide suitable measurements (e.g., position estimates, uncertainty metrics, and errors).

Another approach for estimating the coefficients $\alpha$ and $\beta$ of the above mapping function uses an exhaustive search. By way of example, when training data (e.g., position estimates and uncertainty metrics collected at known ground truths) is collected for each positioning technology k of K positioning technologies, the following process is followed for every integer t from 1 to T (e.g., T=1000): (a) choose a set of parameters $\{\alpha_k^{(t)}, \beta_k^{(t)}\}$ for each positioning technology k, where the parameters for each positioning technology are determined using Equation 5; (b) for every training data point i (e.g., ground truth along with position estimates and uncertainty metrics of the positioning technologies), (i) compute a corrected uncertainty metric as $$\sigma'^{(i)}_k = \alpha_k^{(t)} \sigma_k^{(i)} + \beta_k^{(t)} \qquad \text{(Equation 6)}$$

for each positioning technology k, (ii) compute a combined position estimate by combining the position estimates from all the positioning technologies for the ith data point as $$\hat{x}^{(i)} = \text{optimal\_combining}(x_1^{(i)}, \ldots, x_n^{(i)}, \tilde{\sigma}_1^{(i)}, \ldots, \tilde{\sigma}_n^{(i)}) \qquad \text{(Equation 7),}$$

where the optimal combining method uses Equation 3, and (iii) determine the position error for the ith data point by comparing the computed position estimate $\hat{x}^{(i)}$ against the ground truth for the ith data point, and store computed position error in an array of position_errors(i); and (c) determine the 80$^{th}$ percentile (or some other statistic) of the array of numbers position_errors and save it in an array of numbers as position_error_stats(t). After the position_error_stats(t) array of numbers is determined, determined a value of t such that $$t = \min(\text{position\_error\_stats}) \qquad \text{(Equation 8),}$$

and choose the corresponding $\{\alpha_k, \beta_k\}$'s the correction coefficients for the positioning technologies k=1, ..., n.

Yet another approach for determining the coefficients $\alpha$ and $\beta$ of the above mapping function uses a least squares fit based on the training data, where the least squares fit method uses the array of position error estimates and finds the coefficients for which the minimum mean squared error (MMSE) is obtained.

Factors to Consider for Adjusting Uncertainty Metrics

A position filter with multiple hypotheses can utilize the knowledge of various factors like location environment, source of aiding information, and location platform to adjust the estimated uncertainty correction parameters. The factors for adjusting the uncertainty metric of an estimate can depend on the deployment of the aiding technology. By way of example, deployment of a position technology (e.g., WiFi) can have varying accuracy in different regions defined by a polygon. These polygons can be associated with different morphologies (e.g., dense urban, urban, sub-urban, rural) or buildings or venues which may have different positioning quality for a given technology.

Figure 8:
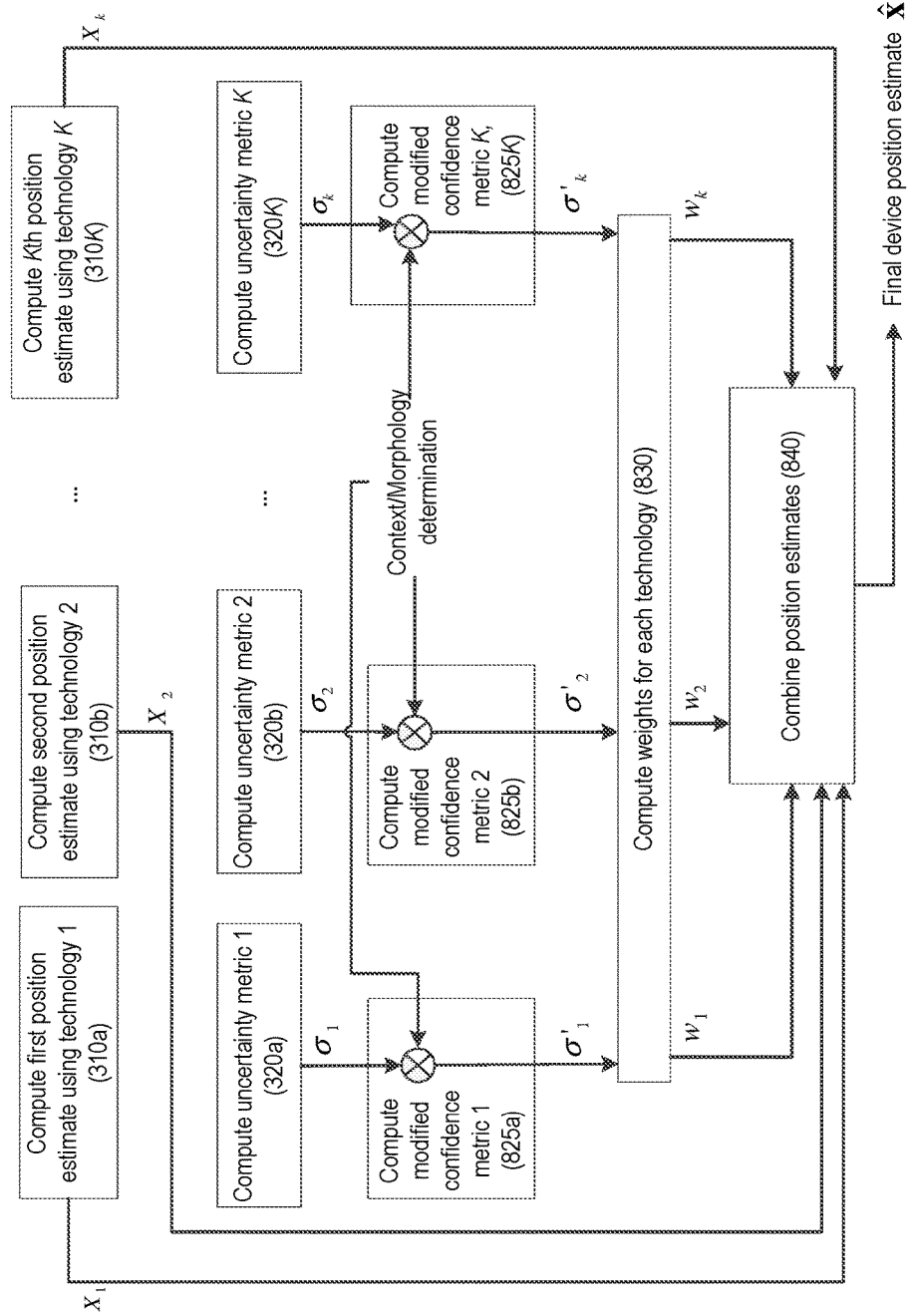
FIG. 8 provides a process for using context or morphology determinations to adjust computed uncertainty metrics before the uncertainty metrics are used to estimate a position of a mobile device.

As shown in FIG. 8, the embodiment for combining position estimates from K different positioning technologies that is shown in FIG. 3 can be adjusted to use context or morphology determinations to adjust computed uncertainty metrics before they are used during the weighting step. Position estimates $x_1, x_2, \ldots x_K$ are computed using K different positioning technologies (310a through 310K), and respective uncertainty metrics $\sigma_1, \sigma_2, \ldots, \sigma_K$ are computed using the K different positioning technologies (320a through 320K). Corrected metrics $\sigma'_1, \sigma'_2, \ldots, \sigma'_K$ are determined using the uncertainty metrics $\sigma_1, \sigma_2, \ldots, \sigma_K$ and a context or morphology determination (825a through 825K). Examples of different approaches for making a context or morphology determination are provided below. The corrected uncertainty metrics $\sigma'_1, \sigma'_2, \ldots, \sigma'_K$ are used to determine weights $w_1, w_2, \ldots w_K$ for each of the K different positioning technologies (830). One approach for determining the weights $w_1, w_2, \ldots w_K$ is described previously with respect to FIG. 3. The weights $w_1, w_2, \ldots w_K$ and the position estimates $x_1, x_2, \ldots x_K$ are used (e.g., combined) to determine a final position estimate $\hat{x}$ (840). Approaches for determining the final position are described elsewhere herein.

The user context can be determined using information from different sensors available on a user device. Different user context like motion (e.g,. stationary or moving), indoor or outdoor position, or other user contexts can be determined using information from sensors like a GNSS receiver, WiFi, Cell-Id, and inertial sensors. The knowledge of user context can be used to determine the confidence of the location information used in aiding.

User motion (e.g,. stationary or moving) can be detected using the GNSS speed information or inertial sensors (accelerometers) information. If the speed from GNSS receiver is above a threshold (e.g,. 0.5 m/s), then the user can be considered to be in motion. Similarly, if the combined acceleration is greater than gravity by a threshold (e.g,. 1 m/s), then user can be considered in motion.

Another user context is to determine is whether the user is indoor or outdoor. This can be determined using information from a GNSS receiver like signal strength of the GNSS satellites, number of satellites tracked compared to visible ones, number of WiFi access points seen and their RSSI information. In one embodiment, the user is considered to be outdoor when the GNSS receiver is able to track a significant percentage of visible satellites (e.g,. more than 75%) with power level generally observed in outdoor conditions (e.g,. higher than −150 dBm).

Barometer data coupled with location information can be used to determine whether the user is on ground floor or in a higher floor.

The information of user context permits utilizing appropriate location information source for aiding.

Use External Location Information to Modify the Weights of a Multi-Hypothesis Position Filter In a third type of embodiment described in further detail below, location information from a first positioning technology is used to modify the weights of different position estimate hypotheses (e.g., weights or particles in a particle filter) used by a second positioning technology. For example, given an LLA estimate with a particular level of uncertainty from the first positioning technology, particles in a particle filter of the second positioning technology are re-weighed by replacement weights or adjustments to previous weights so particles that are closer to the LLA estimate are weighed higher than particles that are comparatively further away from the LLA estimate. The new weights will depend on the level of uncertainty in the LLA estimate.

For the purposes of this section, external location information implies a position estimate received from a first type of positioning technology that is different than a second type of positioning technology used for computing a final estimated position of the mobile. By way of example, the first type of positioning technology may be a Wi-Fi positioning network or a Bluetooth positioning network, and the second type of positioning technology may be a satellite positioning network or terrestrial positioning network like those described in co-assigned U.S. Pat. No. 8,130,141, issued Mar. 6, 2012, and U.S. Patent Application Publication No. US 2012/0182180, published Jul. 19, 2012. The position estimate may instead be the resultant position estimate computed by combining multiple position estimates as described elsewhere herein (e.g., with respect to FIG. 3, FIG. 7, or FIG. 8).

The approaches described below can be applied to any multiple-hypothesis position filter, including a particle filter or a bank of Kalman filters. For purposes of illustration, a particle filter is used as an example in the following description, but the concepts of the following description apply to any multiple-hypothesis position filter.

Figure 9:
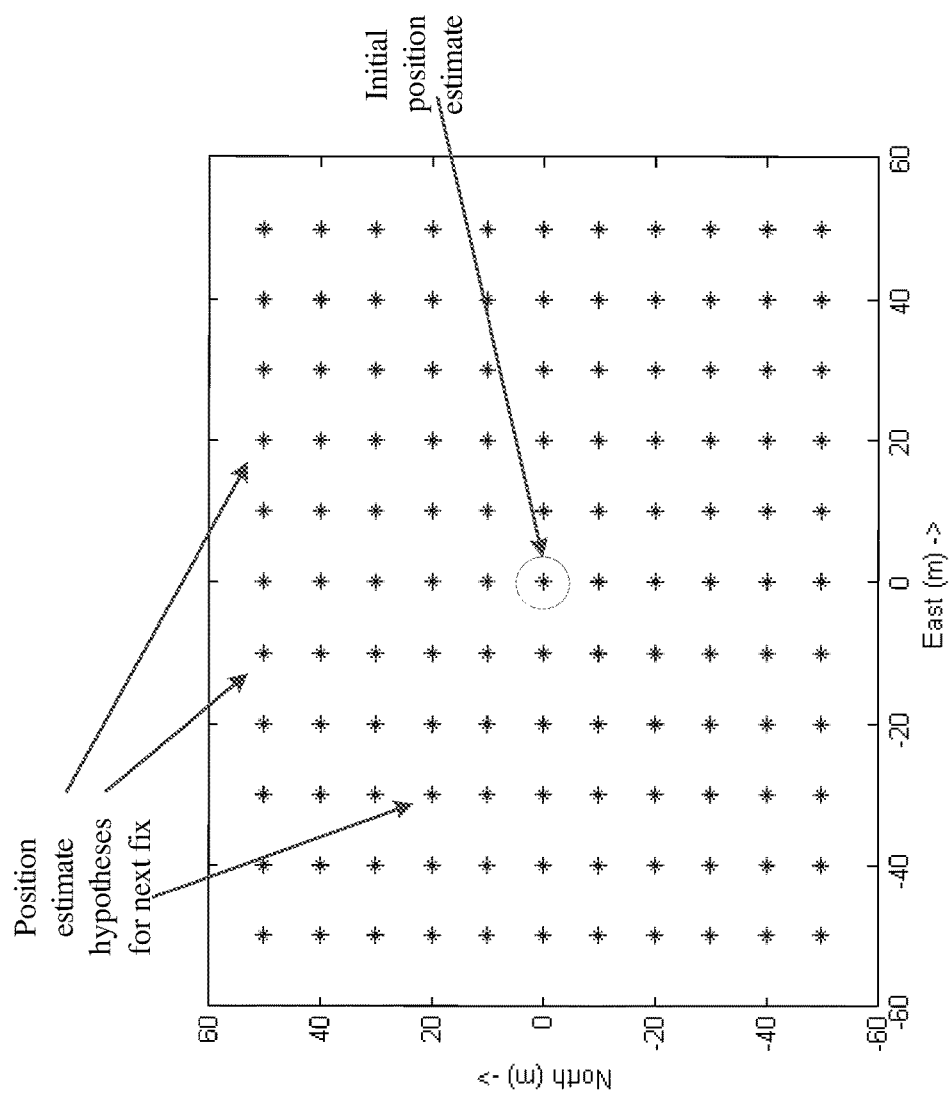
FIG. 9 depicts a grid of points for use in estimating a position of a mobile device.

By way of example, the following processing steps typically occur when a mobile device's position is estimated using a multiple-hypothesis positioning filter, such as a particle filter. The mobile device is started. Signaling data is received from multiple transmitters (e.g., satellites or any other transmitters whose transmitted data can be used to estimate a range or pseudorange, as is known in the art). The signaling data is processed using a ranging function to estimate the time of arrival (TOA) between respective transmitters and the mobile device, along with uncertainty metrics of the estimated TOAs. The TOAs and the uncertainty metrics are inputted to a single-shot positioning function to compute an estimated position of the mobile device. A grid of points in two (horizontal) or three (horizontal x vertical) dimensions is assumed, where the grid of points can be evenly or un-evenly spaced, where each point represents a hypothesis that the mobile device is located at that point, and where the probability of each hypothesis to be true is initially uniform. By way of example, FIG. 9 depicts a grid of points. A single-shot (initial) position estimate is computed to be at (0,0). Then, the mobile device assumes that the next position fix can be anywhere in the 100 meter by 100 meter square grid surrounding that initial position estimate. As an example, one can 'spread' the hypotheses evenly spaced after every 10 meter in both North and East directions. Therefore, as shown in FIG. 9, there can be a total of 121 hypotheses and, when initialized as uniformly distributed, the probability that the next position estimate would exist at one of the hypotheses location is 1/121. When signaling data for the next position fix is received, the probability of each hypothesis is updated based on its 'suitability'. That is, using the TOA estimates and their corresponding uncertainty metrics that are determined for the next position fix, the mobile device determines how likely it is for the position estimate for the mobile device to be at a certain hypothesized location. In certain implementations, the location of some or all hypotheses can also be updated depending on the TOA estimates and their corresponding accuracy metrics.

The example of a multiple-hypothesis position filter described above provides useful position estimates for the mobile device. However, improved position estimates from multiple-hypothesis position filters are possible by using external location information from another positioning technology to modify the weights of different position estimate hypotheses, as described below.

Figure 10:
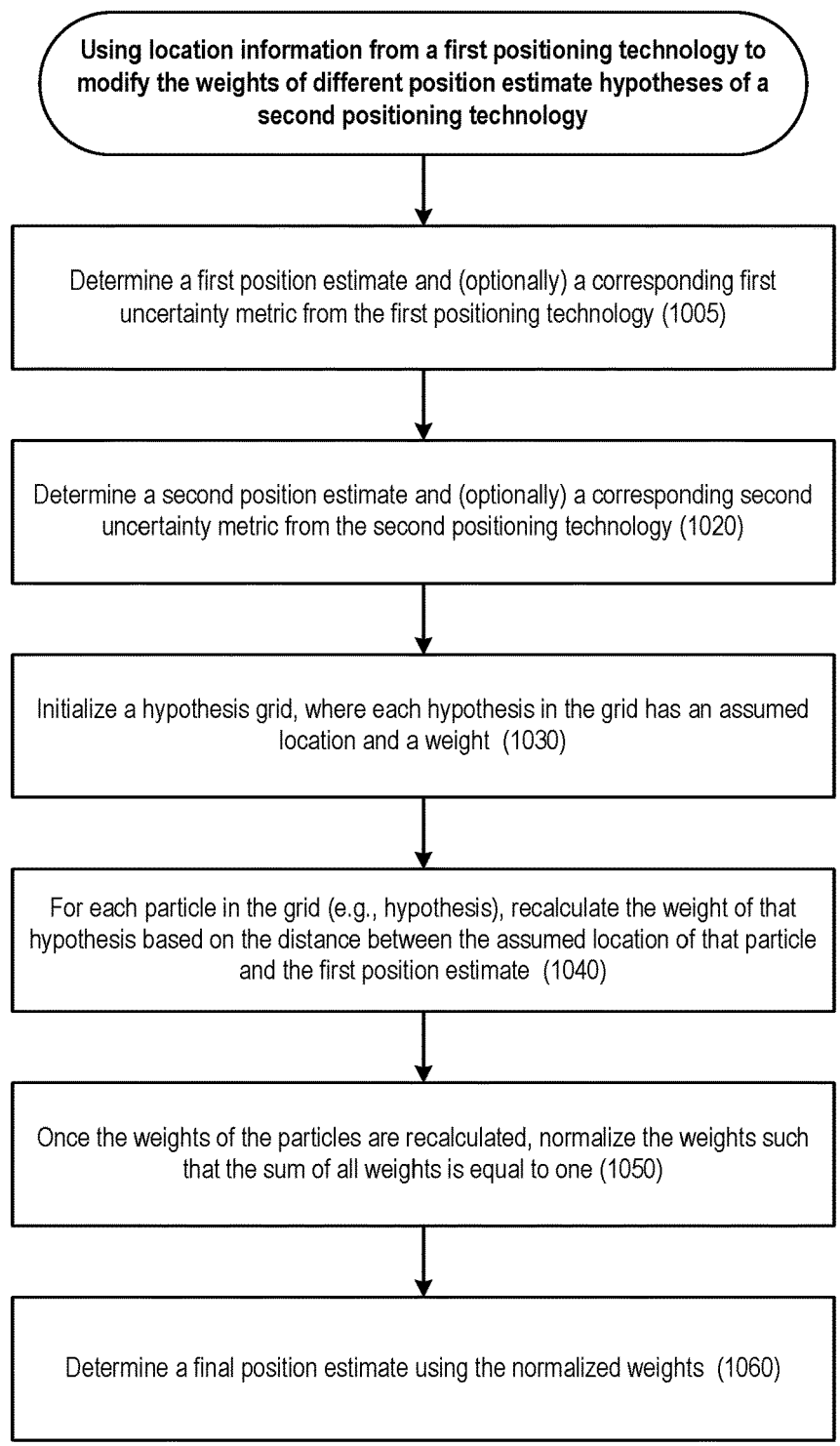
FIG. 10 provides a process for using location information from a first positioning technology to modify the weights of different position estimate hypotheses of a second positioning technology.

One embodiment for using location information from a first positioning technology to modify the weights of different position estimate hypotheses of a second positioning technology is shown in FIG. 10.

As shown, a first position estimate ($lat_{ext}$, $long_{ext}$) and a corresponding first uncertainty metric ($u_{ext}$) from the first positioning technology are determined using known approaches (1010). In some embodiments, the first position estimate may instead be the resultant position estimate computed by combining multiple position estimates as described elsewhere herein (e.g., with respect to FIG. 3, FIG. 7, or FIG. 8).

A second position estimate and a corresponding second uncertainty metric from the second positioning technology are determined using known approaches (1020).

A hypothesis grid (e.g., like the two-dimensional grid in FIG. 9) is initialized using known approaches, where each hypothesis in the grid has an assumed location ($lat_k$, $long_k$) and a weight $w_k$ (1030). A three-dimension grid is also possible, as would be understood by one of ordinary skill in the art.

For each particle (i.e., hypothesis), each weight $w_k$ of that particle is recalculated as $w'_k$ based on the distance between the assumed location ($lat_k$, $long_k$) of that particle and the first position estimate ($lat_{ext}$, $long_{ext}$) (1040). In one implementation, $w'_k = w_k \rho_k$, where the value of a multiplier $\rho_k \in [0,1]$ is a function of the distance between the assumed location ($lat_k$, $long_k$) of that particle and the first position estimate ($lat_{ext}$, $long_{ext}$). One possibility for $\rho_k$ is the following:

$$\rho_k = \exp\left(-\frac{distance((lat_k, long_k), (lat_{ext}, long_{ext}))^2}{\sigma^2_{ext}(u_{ext})}\right), \quad \text{(Equation 9)}$$

where $\sigma_{ext}^2$ ($u_{ext}$) is the variance of the first position estimate ($lat_{ext}$, $long_{ext}$), which is mapped from the uncertainty metric $u_{ext}$ using the mapping concepts described above with respect to correcting uncertainty metric estimates, where the uncertainty metric may or may not be corrected using training data. Any other approaches for determining $\rho_k$ are contemplated. Another approach for determining $\rho_k$ uses values of $\rho_k$ that approach the value of 1 as assumed locations ($lat_k$, $long_k$) approach the first position estimate ($lat_{ext}$, $long_{ext}$), and values of $\rho_k$ that approach the value of 0 as assumed locations ($lat_k$, $long_k$) get further away from the first position estimate ($lat_{ext}$, $long_{ext}$), which means $w_k$ changes less for assumed locations that are closer to the first position estimate ($lat_{ext}$, $long_{ext}$) compared to assumed locations that are further away from the first position estimate ($lat_{ext}$, $long_{ext}$). This is a good outcome since hypotheses close to the first position estimate ($lat_{ext}$, $long_{ext}$) are more trusted than hypotheses further away. In some embodiments, as $\sigma_{ext}^2$ increases, the penalty for being further from the first position estimate ($lat_{ext}$, $long_{ext}$) decreases, which is good when the first position estimate is not very reliable such that the particle weights should not be adjusted as much as when the first position estimate is more reliable.

Once the weights of the particles are recalculated, they can be normalized such that the sum of all weights is equal to one (1050). The normalization can help in numerical stability—e.g., when $\rho_k$ for all particles is extremely small, thereby making $w_k$ approach 0 for all particles. Since $w_k$ is considered as the probability that the final position estimate is at ($lat_k$, $long_k$) in a typical particle filter implementation, a $w_k$ close to zero implies that the final position estimate may not belong to any of the considered hypothesis particle locations.

Finally, the normalized weights are used to determine a final position estimate using known approaches (1060). In one embodiment, the weights are used as the confidence factor or measurement noise estimate in the Kalman or particle filter implementation.

In addition to modifying the weights, methods described below can be used to perform a further integrity check on the quality of the first position estimate that is being used to adjust the weights.

In some cases, the integrity of the first position estimate cannot be controlled. However, the impact of the first position estimate on the final position estimate can be controlled. For example, if the uncertainty of the first position estimate is low, the impact of the first position estimate can be 'floored' so $\rho_k$ is smaller. This would help avoid the situation where the particle filter heavily relies on the first position estimate. In one embodiment, the following equation is used:

$$\sigma^2_{ext}(u_{ext}) = \begin{cases} \text{floor\_val,} & \text{if } \sigma^2_{ext}(u_{ext}) \leq \text{floor\_val} \\ \sigma^2_{ext}(u_{ext}), & \text{otherwise} \end{cases} \quad \text{(Equation 10)}$$

Similarly, if the uncertainty is high (i.e., the first position estimate is not reliable), then the weights are not modified using a $\rho_k$ derived from the first position estimate (or $\rho_k$ is set to a value of 1), which avoids the situations where the first position estimate has large position errors, and using the first position estimate will introduce large errors in the final position estimate. In one embodiment, the following equation is used:

$$\text{if } \sigma_{ext}^2(u_{ext}) > \text{ceil\_val, } \sigma_k = 1 \quad \text{(Equation 11).}$$

Other Aspects

Methods of this disclosure may be implemented by hardware, firmware or software. One or more non-transitory machine-readable media embodying program instructions that, when executed by one or more machines, cause the one or more machines to perform or implement operations comprising the steps of any of the methods described herein are contemplated. As used herein, machine-readable media includes all forms of machine-readable media (e.g. non-volatile or volatile storage media, removable or non-removable media, integrated circuit media, magnetic storage media, optical storage media, or any other storage media) that may be patented under the laws of the jurisdiction in which this application is filed, but does not include machine-readable media that cannot be patented under the laws of the jurisdiction in which this application is filed.

By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art. Systems that include one or more machines or the one or more non-transitory machine-readable media embodying program instructions that, when executed by the one or more machines, cause the one or more machines to perform or implement operations comprising the steps of any methods described herein are also contemplated.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together, or separated by one or more intervening things. Where no lines and intervening things connect two particular things, coupling of those things is contemplated in at least one embodiment unless otherwise stated. Where an output of one thing and an input of another thing are coupled to each other, information sent from the output is received by the input even if the data passes through one or more intermediate things. Different communication pathways and protocols may be used to transmit information disclosed herein. Information like data, instructions, commands, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a mobile device or a server, may identify the following: the transmitter; the transmitter's location (LLA); pressure, temperature, humidity, and/or other conditions at or near the transmitter.

A mobile device may include any of: antenna module(s) for exchanging signals with other systems; RF front end module(s) with circuitry components that are known; processing module(s) for signal processing of received signals to determine position information (e.g., times of arrival or travel time of received signals, atmospheric information from transmitters, and/or location or other information associated with each transmitter); processing module(s) for using the position information to compute an estimated position of the mobile device; processing module(s) for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, other), which may be compared to the same environmental conditions at or near transmitters to determine the altitude of the mobile device; other sensor module(s) for measuring other conditions (e.g., movement, orientation); interface module(s) for exchanging information with other systems via other links other than a radio link; and/or I/O module(s) for permitting user interaction with the mobile device.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to the following related application(s): U.S. Pat. Appl. No. 62/456,492, filed Feb. 8, 2017, entitled SYSTEMS AND METHODS FOR ESTIMATING A POSITION OF A RECEIVER; and U.S. Pat. Appl. No. 62/572,497, filed Oct. 15, 2017, entitled SYSTEMS AND METHODS FOR ESTIMATING A POSITION OF A RECEIVER. The content of each of the related application(s) is hereby incorporated by reference herein in its entirety.

The invention claimed is:

1. A method for estimating a position of a mobile device using information from two positioning technologies wherein the method comprises:
    determining a first position estimate for the mobile device using a first positioning technology;
    determining a second position estimate for the mobile device using a second positioning technology;
    determining a first uncertainty metric that represents uncertainty of the first position estimate;
    determining a second uncertainty metric that represents uncertainty of the second position estimate;
    determining a first variance using the first uncertainty metric;
    determining a second variance using the second uncertainty metric;
    determining a total variance using the first variance and the second variance;
    determining a first ratio of the first variance to the total variance;
    determining a second ratio of the second variance to the total variance;
    determining a first weight using the first ratio;
    determining a second weight using the second ratio;
    applying the first weight to the first position estimate to generate a first weighted position estimate;
    applying the second weight to the second position estimate to generate a second weighted position estimate, and
    determining a final position estimate for the mobile device using an average of at least the first weighted position estimate and the second weighted position estimate.

2. The method of claim 1, wherein the total variance comprises a sum of a plurality of variances that include the first variance and the second variance.

3. A method for estimating a position of a mobile device using information from two positioning technologies, wherein the method comprises:
- determining a first position estimate for the mobile device using a first positioning technology;
- determining a second position estimate for the mobile device using a second positioning technology;
- determining a first uncertainty metric that represents uncertainty of the first position estimate;
- determining a second uncertainty metric that represents uncertainty of the second position estimate;
- determining a first corrected uncertainty metric by inputting the first uncertainty metric into a first mapping function;
- determining a second corrected uncertainty metric by inputting the second uncertainty metric into a second mapping function;
- determining a first weight using the first corrected uncertainty metric;
- determining a second weight using the second corrected uncertainty metric;
- applying the first weight to the first position estimate to generate a first weighted position estimate; and
- applying the second weight to the second position estimate to generate a second weighted position estimate;
- determining a final position estimate for the mobile device using a combination of the first weighted position estimate and the second weighted position estimate.

4. The method of claim 3, wherein:
- the first mapping function multiplies the first uncertainty metric by a first multiplied coefficient to produce a first product, and sums the first product and a first added coefficient to produce the first corrected uncertainty metric; and
- the second mapping function multiplies the second uncertainty metric by a second multiplied coefficient to produce a second product, and sums the second product and a second added coefficient to produce the second corrected uncertainty metric.

5. A method for estimating a position of a mobile device using information from two positioning technologies, wherein the method comprises:
- determining a first position estimate for the mobile device using a first positioning technology; and
- using a second positioning technology to:
  - initialize a hypothesis grid, where each hypothesis in the grid has an assumed location and a weight;
  - for each hypothesis in the grid, recalculate the weight of that hypothesis based on a respective distance between the assumed location and the first position estimate; and
  - normalizing the recalculated weights such that the sum of all of the recalculated weights is equal to one;
  - determine a final position estimate for the mobile device using the normalized weights.

6. The method of claim 5, wherein the final position estimate is determined using the normalized weights by using the normalized weights as a confidence factor or measurement noise estimate in a Kalman or particle filter.

7. The method of claim 5, wherein for each particular hypothesis in the grid, the recalculated weight of the particular hypothesis is determined using (a) the weight of the particular hypothesis and (b) a multiplier that is determined using an exponential function of a negative value, wherein the value is determined by dividing (i) a square of the respective distance between the assumed location of the particular hypothesis and the first position estimate by (ii) a variance of the first position estimate.

8. The method of claim 5, wherein for each particular hypothesis in the grid, the recalculated weight of the particular hypothesis is determined using (a) the weight of the particular hypothesis and (b) a multiplier that is (i) larger than each other multiplier used to determine a respective recalculated weight of a respective hypothesis in the grid that has a respective assumed location that is further away from the first position estimate than the assumed location of the particular hypothesis, and (ii) smaller than each other multiplier used to determine a respective recalculated weight of a respective hypothesis in the grid that has a respective assumed location that is closer to the first position estimate than the assumed location of the particular hypothesis.

9. A method for estimating a position of a mobile device using information from two positioning technologies, wherein the method comprises:
- for each transmitter in a transmitter network of a first positioning technology, estimating a pseudorange between an unknown location of the mobile device and a known location of that transmitter;
- determining an estimated position of the unknown location of the mobile device using a second positioning technology;
- determining an uncertainty metric of the estimated position;
- for each transmitter in the transmitter network, determining a distance between the estimated position and the known location of that transmitter;
- for each transmitter in the transmitter network, determining a pseudorange error as the difference between the estimated pseudorange for that transmitter and the determined distance for that transmitter;
- determining a scale factor that is based on the uncertainty metric;
- for each transmitter in the transmitter network, determining a pseudorange correction for that transmitter by scaling the determined pseudorange error for that transmitter using the scale factor; and
- for each transmitter in the transmitter network, determining a corrected pseudorange for that transmitter as the difference between the estimated pseudorange for that transmitter and the pseudorange correction for that transmitter.

10. The method of claim 9, wherein the method comprises:
- determining a final position estimate for the mobile device using the corrected pseudoranges.

11. One or more non-transitory machine-readable media embodying program instructions that, when executed by one or more machines, cause the one or more machines to implement a method for estimating a position of a mobile device using information from two positioning technologies wherein the method comprises:
- determining a first position estimate for the mobile device using a first positioning technology;
- determining a second position estimate for the mobile device using a second positioning technology;
- determining a first uncertainty metric that represents uncertainty of the first position estimate;
- determining a second uncertainty metric that represents uncertainty of the second position estimate;
- determining a first variance using the first uncertainty metric;
- determining a second variance using the second uncertainty metric;

determining a total variance using the first variance and the second variance;

determining a first ratio of the first variance to the total variance;

determining a second ratio of the second variance to the total variance;

determining a first weight using the first ratio;

determining a second weight using the second ratio;

applying the first weight to the first position estimate to generate a first weighted position estimate;

applying the second weight to the second position estimate to generate a second weighted position estimate, and determining a final position estimate for the mobile device using an average of at least the first weighted position estimate and the second weighted position estimate.

12. The one or more non-transitory machine-readable media of claim 11, wherein the total variance comprises a sum of a plurality of variances that include the first variance and the second variance.

13. One or more non-transitory machine-readable media embodying program instructions that, when executed by one or more machines, cause the one or more machines to implement a method for estimating a position of a mobile device using information from two positioning technologies, wherein the method comprises:

determining a first position estimate for the mobile device using a first positioning technology;

determining a second position estimate for the mobile device using a second positioning technology;

determining a first uncertainty metric that represents uncertainty of the first position estimate;

determining a second uncertainty metric that represents uncertainty of the second position estimate;

determining a first corrected uncertainty metric by inputting the first uncertainty metric into a first mapping function;

determining a second corrected uncertainty metric by inputting the second uncertainty metric into a second mapping function;

determining a first weight using the first corrected uncertainty metric;

determining a second weight using the second corrected uncertainty metric;

applying the first weight to the first position estimate to generate a first weighted position estimate; and applying the second weight to the second position estimate to generate a second weighted position estimate;

determining a final position estimate for the mobile device using a combination of the first weighted position estimate and the second weighted position estimate.

14. The one or more non-transitory machine-readable media of claim 13, wherein:

the first mapping function multiplies the first uncertainty metric by a first multiplied coefficient to produce a first product, and sums the first product and a first added coefficient to produce the first corrected uncertainty metric; and the second mapping function multiplies the second uncertainty metric by a second multiplied coefficient to produce a second product, and sums the second product and a second added coefficient to produce the second corrected uncertainty metric.

15. One or more non-transitory machine-readable media embodying program instructions that, when executed by one or more machines, cause the one or more machines to implement a method for estimating a position of a mobile device using information from two positioning technologies, wherein the method comprises:

determining a first position estimate for the mobile device using a first positioning technology; and using a second positioning technology to:
initialize a hypothesis grid, where each hypothesis in the grid has an assumed location and a weight;

for each hypothesis in the grid, recalculate the weight of that hypothesis based on a respective distance between the assumed location and the first position estimate; and normalizing the recalculated weights such that the sum of all of the recalculated weights is equal to one;

determine a final position estimate for the mobile device using the normalized weights.

16. The one or more non-transitory machine-readable media of claim 15, wherein the final position estimate is determined using the normalized weights by using the normalized weights as a confidence factor or measurement noise estimate in a Kalman or particle filter.

17. The one or more non-transitory machine-readable media of claim 15, wherein for each particular hypothesis in the grid, the recalculated weight of the particular hypothesis is determined using (a) the weight of the particular hypothesis and (b) a multiplier that is determined using an exponential function of a negative value, wherein the value is determined by dividing (i) a square of the respective distance between the assumed location of the particular hypothesis and the first position estimate by (ii) a variance of the first position estimate.

18. The one or more non-transitory machine-readable media of claim 15, wherein for each particular hypothesis in the grid, the recalculated weight of the particular hypothesis is determined using (a) the weight of the particular hypothesis and (b) a multiplier that is (i) larger than each other multiplier used to determine a respective recalculated weight of a respective hypothesis in the grid that has a respective assumed location that is further away from the first position estimate than the assumed location of the particular hypothesis, and (ii) smaller than each other multiplier used to determine a respective recalculated weight of a respective hypothesis in the grid that has a respective assumed location that is closer to the first position estimate than the assumed location of the particular hypothesis.

19. One or more non-transitory machine-readable media embodying program instructions that, when executed by one or more machines, cause the one or more machines to implement a method for estimating a position of a mobile device using information from two positioning technologies, wherein the method comprises:

for each transmitter in a transmitter network of a first positioning technology, estimating a pseudorange between an unknown location of the mobile device and a known location of that transmitter;

determining an estimated position of the unknown location of the mobile device using a second positioning technology;

determining an uncertainty metric of the estimated position;

for each transmitter in the transmitter network, determining a distance between the estimated position and the known location of that transmitter;

for each transmitter in the transmitter network, determining a pseudorange error as the difference between the estimated pseudorange for that transmitter and the determined distance for that transmitter;

determining a scale factor that is based on the uncertainty metric;

for each transmitter in the transmitter network, determining a pseudorange correction for that transmitter by scaling the determined pseudorange error for that transmitter using the scale factor; and for each transmitter in the transmitter network, determining a corrected pseudorange for that transmitter as the difference between the estimated pseudorange for that transmitter and the pseudorange correction for that transmitter.

20. The one or more non-transitory machine-readable media of claim 19, wherein the method comprises:

determining a final position estimate for the mobile device using the corrected pseudoranges.

* * * * *